United States Patent
Orihashi et al.

(10) Patent No.: US 12,170,767 B2
(45) Date of Patent: Dec. 17, 2024

(54) ENCODING APPARATUS, ENCODING METHOD, AND PROGRAM

(71) Applicant: NIPPON TELEGRAPH AND TELEPHONE CORPORATION, Tokyo (JP)

(72) Inventors: Shota Orihashi, Musashino (JP); Shinobu Kudo, Musashino (JP); Ryuichi Tanida, Musashino (JP); Atsushi Shimizu, Musashino (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 206 days.

(21) Appl. No.: 17/620,919

(22) PCT Filed: Jun. 21, 2019

(86) PCT No.: PCT/JP2019/024637
§ 371 (c)(1),
(2) Date: Dec. 20, 2021

(87) PCT Pub. No.: WO2020/255367
PCT Pub. Date: Dec. 24, 2020

(65) Prior Publication Data
US 2022/0337830 A1    Oct. 20, 2022

(51) Int. Cl.
*H04N 19/119*    (2014.01)
*H04N 19/149*    (2014.01)
(Continued)

(52) U.S. Cl.
CPC ......... *H04N 19/119* (2014.11); *H04N 19/149* (2014.11); *H04N 19/159* (2014.11); *H04N 19/176* (2014.11)

(58) Field of Classification Search
None
See application file for complete search history.

(56) References Cited

U.S. PATENT DOCUMENTS

2019/0215534 A1*  7/2019  Kondo .................. H04N 19/61
2022/0046284 A1*  2/2022  Nishi ................... H04N 19/192
(Continued)

OTHER PUBLICATIONS

Shota Orihashi, Image Coding based on Completion using Generative Adversarial Networks, IEICE Technical Report, vol. 118, No. 113, 2018, pp. 33-38.
(Continued)

*Primary Examiner* — Samuel D Fereja
(74) *Attorney, Agent, or Firm* — Harness, Dickey & Pierce, P.L.C.

(57) ABSTRACT

A coding apparatus is a coding apparatus for coding an original image and includes: a division section that divides the original image into blocks that are a plurality of areas to acquire the plurality of blocks; a determination section that, for each of the blocks, determines whether or not to determine the block as an interpolation target; and a substitution section that substitutes a value of a pixel included in the block determined as the interpolation target, with a value that decreases a code amount of the block determined as the interpolation target. The determination section determines whether or not to determine the area that is a target of the determination as an area that is the interpolation target, using an evaluation based on an accuracy of prediction of an image of the block by intra prediction or inter prediction and a degree of the area that is the interpolation target being a generated one.

7 Claims, 9 Drawing Sheets

(51) Int. Cl.
*H04N 19/159* (2014.01)
*H04N 19/176* (2014.01)

(56) References Cited

U.S. PATENT DOCUMENTS

2022/0329793 A1* 10/2022 Lim ............... H04N 19/117
2023/0141171 A1* 5/2023 Jeong ............ H04N 19/137
375/240.29

OTHER PUBLICATIONS

K. McCann et al., High Efficiency Video Coding (HEVC) Test Model 16 (HM 16) Encoder Description, Joint Collaborative Team on Video Coding (JCT-VC) of ITU-T SG16 WP3 and ISO/IEC JTC1/SC29/WG11 18th Meeting, Jun. 30, 2014.
Shouta Orihashi et al., A Study on Block-based Image Coding Applying Completion by Generative Adversarial Network, 2018 ITE Annual Convention Program, Aug. 29, 2018.
Shouta Orihashi et al., A Study on Video Completion using Generative Adversarial Networks, 2019 IEICE General Conference, Mar. 19, 2019.

* cited by examiner

ENCODING APPARATUS, ENCODING METHOD, AND PROGRAM

CROSS-REFERENCE TO RELATED APPLICATIONS

This application is a 371 U.S. National Phase of International Application No. PCT/JP2019/024637 filed on Jun. 21, 2019. The entire disclosures of the above applications are incorporated herein by reference.

TECHNICAL FIELD

The present invention relates to a coding apparatus, a coding method, and a program.

BACKGROUND ART

As standards for compressing moving image data, MPEG (Moving Picture Experts Group)-4, H.264/AVC (Advanced Video Coding) and H.265/HEVC (High Efficiency Video Coding) (hereinafter referred to as "HEVC") have been known. Also, development of a new standard following HEVC has been being discussed.

Coding methods of these standards are coding methods aimed to make an original image and a decoded image coincide with each other on a pixel-by-pixel basis. According to these standards, a predicted image is generated based on correlation in a time-space direction between pixels. A coding apparatus reduces a code amount by deriving a residual error between a predicted image and an original image and transmitting the residual error. However, in the case of an original image including a complicated image (uneven image) such as an image of texture, prediction efficiency decreases, and thus, coding efficiency decreases.

Unlike these coding methods, a method in which a coding apparatus removes partial areas of an original image and the original image with the partial areas missing (hereinafter referred to as "defective image") is coded has been proposed (see Non-Patent Literature 1). The coding apparatus transmits coded data of the defective image to a decoding apparatus. An amount of information of the defective image is small in comparison with an amount of information of the original image, and thus, a data amount of the coded data of the defective image is small in comparison with a data amount of coded data of the original image. The decoding apparatus generates images of the respective areas missing in the decoded defective image in a simulated manner according to a predetermined method. The decoding apparatus generates a restored image by interpolating the respective images generated in a simulated manner to the respective areas missing in the defective image.

In Non-Patent Literature 1, in a decoding apparatus, a convolutional neural network generates a restored image by means of image interpolation processing. A coding apparatus removes an area that is a target of image interpolation (hereinafter referred to as "interpolation target area") in an original image. Consequently, an amount of information of an original image is reduced, and thus, the coding apparatus can enhance coding efficiency based on subjective image quality.

For each of areas in the original image, the coding apparatus determines whether the area is determined as an interpolation target area or is determined as an area that is not a target of image interpolation (area other than an interpolation target area) (hereinafter referred to as "non-interpolation area"). If whether or not to determine the area as an interpolation target area is properly determined, enhancement in coding efficiency can be expected. However, a method for a coding apparatus to properly determine whether or not to determine the area as an interpolation target area has not been established.

In coding using reference software (HEVC Test Model: HM) for HEVC, when a coding mode is selected, a cost is derived based on a difference between a predicted image generated according to the coding mode and an original image. In Non-Patent Literature 2, when a coding mode is selected, a coding distortion D is derived based on a difference between a predicted image generated according to the coding mode and an original image. A cost "J" of the coding mode based on the coding distortion "D" is represented by Expression (1). A coding apparatus selects a coding mode whose cost is minimum (see Non-Patent Literature 2).

[Math. 1]

$$J = D + \lambda R \quad (1)$$

Here, R is an amount of codes generated according to the coding mode. $\lambda$ is a Lagrange multiplier (constant).

In Non-Patent Literature 2, as a measure of evaluation of coding distortion, a sum of squared errors (hereinafter referred to as "SSE"), a sum of absolute errors or a sum of absolute Hadamard transformed differences is used. The measure of evaluation of coding distortion is derived based on pixel-by-pixel differences between the predicted image and the original image. For example, using a block "Block A" and a block "Block B" each formed of a group of "i×j" pixels, SSE is represented by Expression (2).

[Math. 2]

$$\begin{cases} SSE = \sum_{i,j} \mathit{Diff}(i,j)^2 \\ \mathit{Diff}(i,j) = BlockA(i,j) - BlockB(i,j) \end{cases} \quad (2)$$

Where this is used for processing for determining whether or not to determine an area as an interpolation target area in the coding apparatus in Non-Patent Literature 1, for each area, the coding apparatus compares a cost where the area is determined as an interpolation target area and a cost where the area is determined as a non-interpolation area, using an evaluation function that compares pixel-by-pixels differences between a predicted image and an original image. The coding apparatus selects a coding mode whose cost is smaller. In this way, for each area, the coding apparatus determines whether or not to determine the area as an interpolation target area. The decoding apparatus generates a restored image by means of image interpolation processing.

CITATION LIST

Non-Patent Literature

Non-Patent Literature 1: Shota Orihashi, Shinobu Kudo, Masaki Kitahara, Atsushi Shimizu, "Image Coding based on Completion using Generative Adversarial Networks," IEICE Technical Report, vol. 118, no. 113, IE2018-27, pp. 33-38, June. 2018.

Non-Patent Literature 2: K. McCann, C. Rosewarne, B. Bross, M. Naccari, K. Sharma n, G. Sullivan, "High Efficiency Video Coding (HEVC) Test Model 16 (HM 16) Encoder Description," JCTVC-R1002, October. 2014.

SUMMARY OF THE INVENTION

Technical Problem

Where a coding apparatus performs the above determination processing for an original image formed of even areas (non-complex areas), because for each even area, it is possible to obtain values close to those of the original image on a pixel-by-pixel basis by means of interpolation processing, the coding apparatus can determine whether or not to determine the area as an interpolation target area, using an evaluation function that compares differences on a pixel-by-pixel basis.

On the other hand, a coding apparatus performs the above determination processing for an original image including a complex area (for example, an area of texture), for the complex area, it is impossible to obtain values close to those of the original image on a pixel-by-pixel basis by means of interpolation processing. Therefore, the coding apparatus cannot determine the complex area, which involves a large amount of information, as an interpolation target area, resulting in a decrease in coding efficiency.

Also, where a measure for evaluating a coding distortion based on pixel-by-pixel differences is used for an original image including a complex area, interpolation of an average image of the original image to an interpolation target area is determined as more significant than interpolation of the complex image to the interpolation target area. Therefore, a decoding apparatus tends to produce an image in which the average image of the original image is interpolated to the interpolation target area, as a restored image. Where the average image of the original image is interpolated, the restored image is likely to be blurred, resulting in deterioration in subjective image quality of the restored image.

Therefore, there is a need for a method for, even if an original image and a restored image do not coincide with each other on a pixel-by-pixel basis, properly determining an interpolation target area in such a manner that subjective image quality of the restored image becomes favorable.

In view of the above circumstances, an object of the present invention is to provide a coding apparatus, a coding method, and a program that enable determining an interpolation target area in an input original image in such a manner that subjective image quality of a restored image becomes favorable.

Means for Solving the Problem

Apparatus for coding an original image, the coding apparatus including: a division section that divides the original image into blocks that are a plurality of areas to acquire the plurality of blocks; a determination section that, for each of the blocks, determines whether or not to determine the block as an interpolation target; and a substitution section that substitutes a value of a pixel included in the block determined as the interpolation target, with a value that decreases a code amount of the block determined as the interpolation target, wherein the determination section determines whether or not to determine the area that is a target of the determination as an area that is the interpolation target, using an evaluation based on an accuracy of prediction of an image of the block by intra prediction or inter prediction and a degree of the area that is the interpolation target being a generated one.

EFFECTS OF THE INVENTION

The present invention enables determining an interpolation target area in an original image in such a manner that subjective image quality of a restored image becomes favorable.

DESCRIPTION OF EMBODIMENTS

Embodiments of the present invention will be described in detail with reference to the drawings.

As stated above, from the perspective of reduction in coding amount, it can be considered effective that a coding apparatus codes an original image in which a complex area is missing and a decoding apparatus interpolates the missing area to the original image. However, there may be cases where removing an area is not proper, such as a case where even if a coding apparatus can reduce a coding amount, a decoding apparatus cannot interpolate a missing area with high accuracy. Furthermore, accuracy of interpolation differs depending on an image that is a target of coding and a processing content of the interpolation. Therefore, for each of combinations of an image that is a target of coding and a processing content of interpolation, it is conceivable to introduce an index for well-balanced evaluation of a code amount eliminated by the interpolation and accuracy of an area interpolated.

First Embodiment

Figure 1:
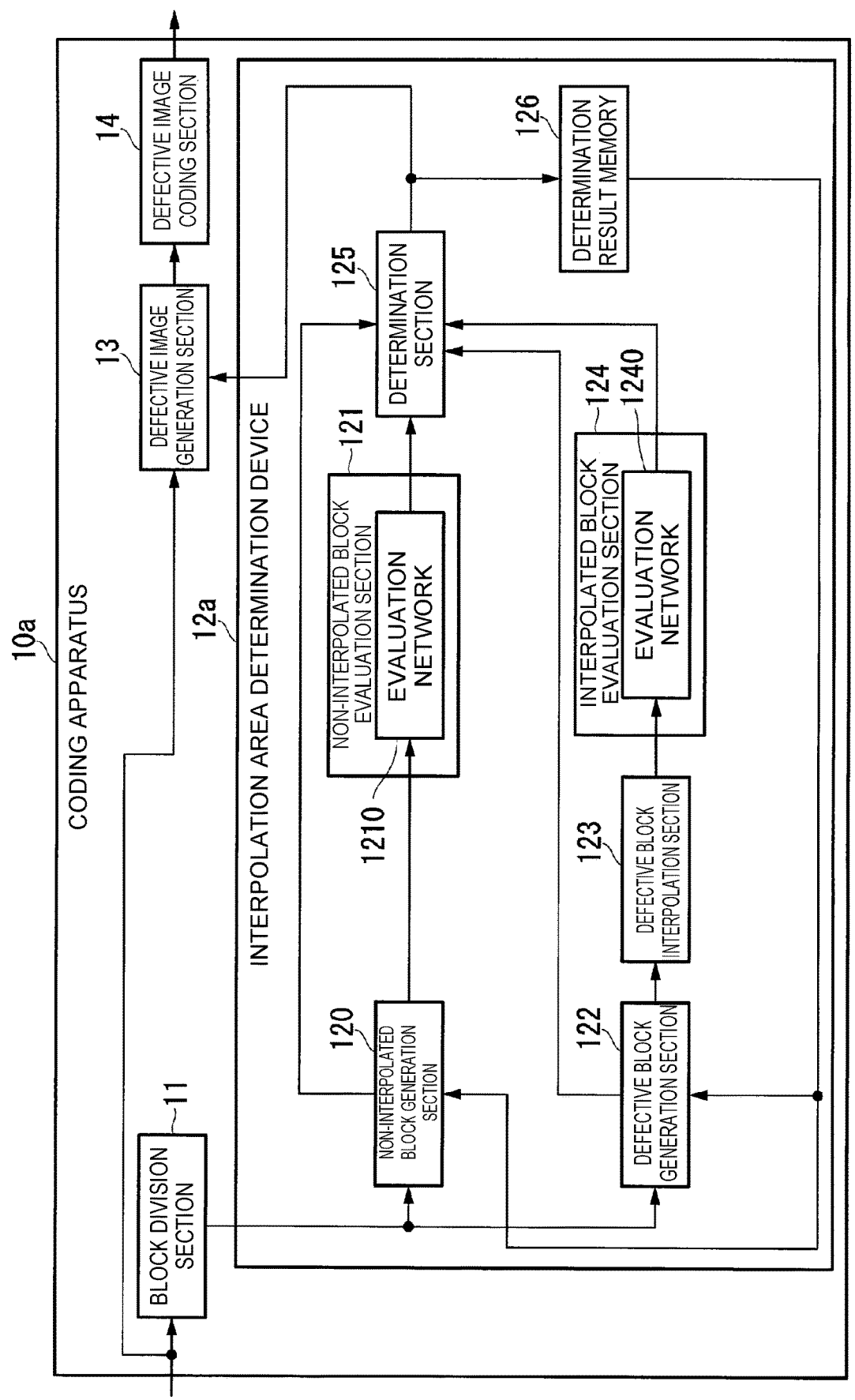
FIG. 1 is a diagram illustrating an example configuration of a coding apparatus in a first embodiment.

FIG. 1 is a diagram illustrating an example configuration of a coding apparatus 10a. The coding apparatus 10a is an apparatus that codes data of, e.g., a moving image or a still image. The coding apparatus 10a includes a block division section 11, an interpolation area determination device 12a, a defective image generation section 13 and a defective image coding section 14. The interpolation area determination device 12a includes a non-interpolated block generation section 120, a non-interpolated block evaluation section 121, a defective block generation section 122, a defective block interpolation section 123, an interpolated block evaluation section 124, a determination section 125 and a determination result memory 126.

Figure 2:
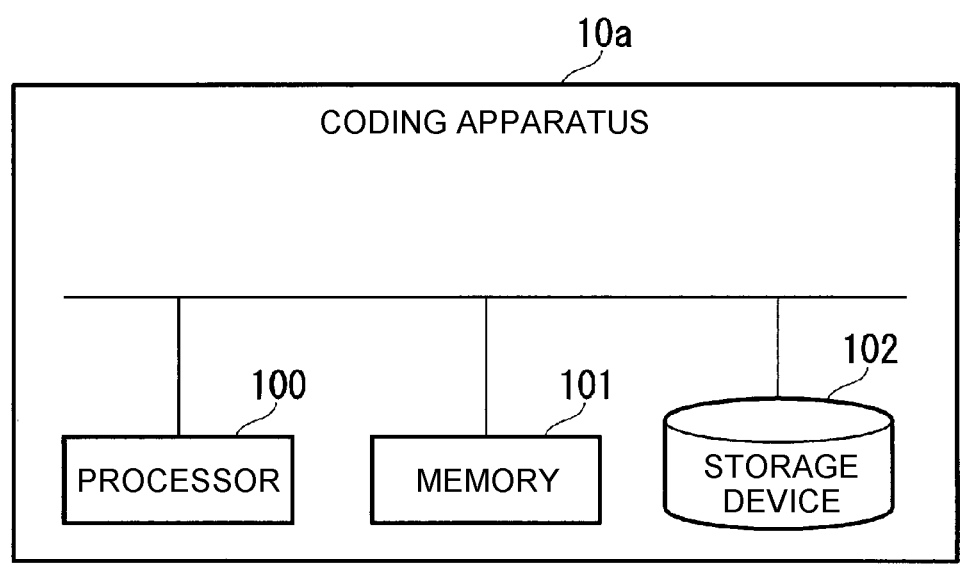
FIG. 2 is a diagram illustrating an example of a hardware configuration of the coding apparatus in the first embodiment.

FIG. 2 is a diagram illustrating an example of a hardware configuration of the coding apparatus 10a. The coding apparatus 10a includes a processor 100, a memory 101, and a storage device 102.

The functional sections illustrated in FIG. 1 (the block division section 11, the defective image generation section 13, the defective image coding section 14, the non-interpolated block generation section 120, the non-interpolated block evaluation section 121, the defective block generation section 122, the defective block interpolation section 123, the interpolated block evaluation section 124 and the determination section 125) are implemented in the form of software by execution of a program loaded onto the memory 101 from the storage device 102, which is a non-volatile recording medium (non-transitory recording medium), by the processor 100 such as a CPU (central processing unit).

The determination result memory 126 illustrated in FIG. 1 is implemented, for example, using the memory 101. The program may be recorded on a computer-readable recording medium. Examples of the computer-readable recording medium include non-transitory recording mediums including, e.g., removable mediums such as a flexible disk, a magnetooptical disk, a ROM (read-only memory) and a CD-ROM (compact disc read-only memory), and the storage device 102, such as a hard disk, incorporated in a computer system. The program may be transmitted through a telecommunication channel.

The coding apparatus 10a may be partly or entirely implemented by hardware including an electronic circuit or circuitry using, for example, an LSI (large-scale integration circuit), an ASIC (application-specific integrated circuit), a PLD (programmable logic device) or an FPGA (field-programmable gate array).

In FIG. 1, the block division section 11 acquires an original image that is a target of coding processing (target image) as an input image. A format of the input image may be either a moving image format or a still image format. A shape of a frame of the input image is, for example, a rectangular shape. The block division section 11 performs block division processing for the input image. In the block division processing, the block division section 11 divides the input image into blocks, for each of the blocks, whether or not to determine the block as an interpolation target area being determined (hereinafter, referred to as "determination target block").

Figure 3:
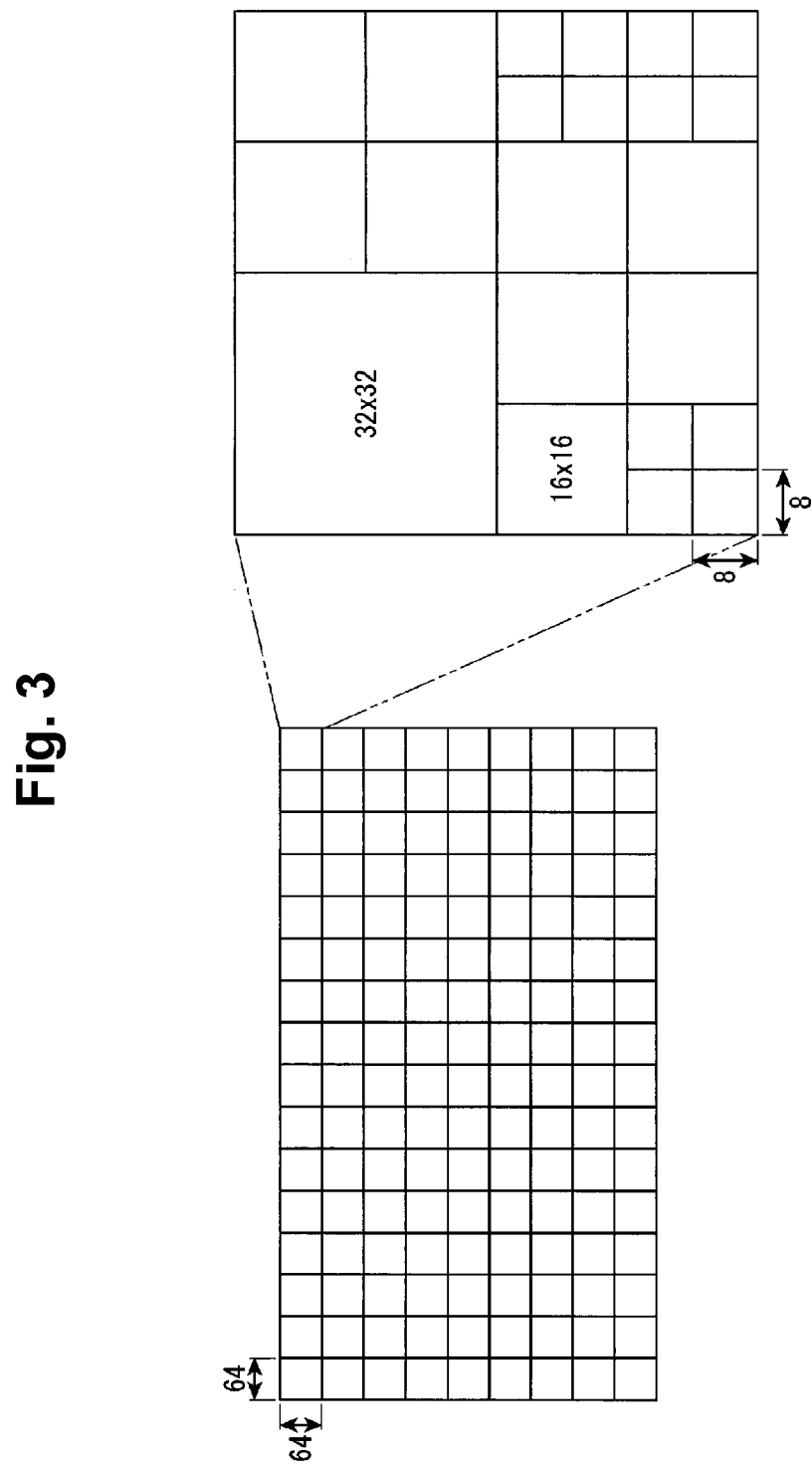
FIG. 3 is a diagram illustrating an example of block division in HEVC in the first embodiment.

FIG. 3 is a diagram illustrating an example of block division in HEVC. A shape or a size of each determination target block is, for example, a shape or a size of a coding tree unit (CTU) of 64×64 pixels or a shape or a size of a coding unit (CU) of 32×32 pixels in HEVC. The block division section 11 outputs the determination target blocks to the non-interpolated block generation section 120 and the defective block generation section 122 in a predetermined processing order.

Figure 4:
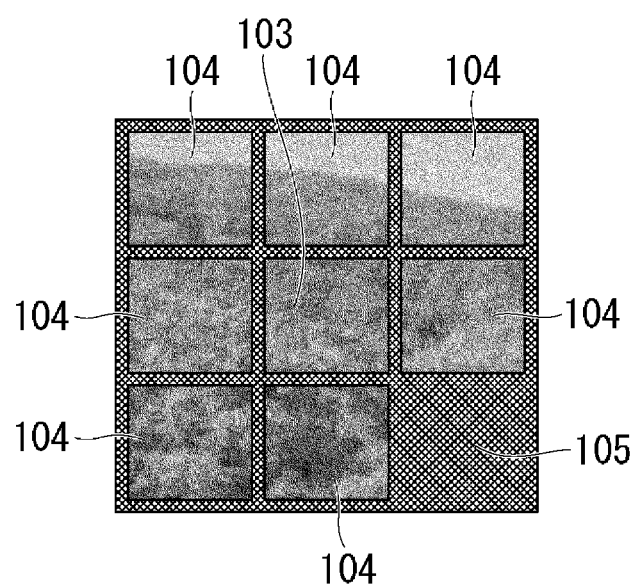
FIG. 4 is a diagram illustrating an example of a determination target block in the first embodiment.

FIG. 4 is a diagram illustrating an example of a determination target block. An example of a determination target block will be described taking HEVC as an example. An example of a determination target block in which, for example, a CTU is the determination target block and CUs each having a determined division size are determination target areas, for each of which whether or not to select the determination target area as an interpolation target is determined will be described. However, as described above, a unit of determination of whether or not to select an area as an interpolation target may be a CTU, a CU or an area having a shape other than a square shape as a result of division. In other words, a unit of an area to be determined as an interpolation target may be any unit as long as the unit enables distinguishment between an area in which code amount reduction and interpolation accuracy can be kept constant and an area in which an effect of code amount reduction is low or an area in which interpolation accuracy is equal or below a tolerable range. A determination target block can include an area for which whether or not to select the area as an interpolation target area is determined (hereinafter referred to as "determination target area"). In FIG. 4, the determination target block includes a determination target area 103.

A determination target block may include one or more areas to be referred to when an image is interpolated to a defective image (hereinafter referred to as "reference areas"), around a determination target area. In FIG. 4, the determination target block includes seven reference areas 104.

A determination target block may include one or more areas not to be referred to when an image is interpolated to a defective image (hereinafter referred to as "non-reference area"), around a determination target area. In FIG. 4, the determination target block includes one non-reference area 105.

In FIG. 1, the interpolation area determination device 12a acquires determination target blocks from the block division section 11. For each of the determination target blocks, the interpolation area determination device 12a performs processing for determining whether or not to determine the determination target block as an interpolation target area (hereinafter referred to as "interpolation area determination processing").

The coding apparatus 10a codes an original image in advance, using a fixed quantization parameter. In the original image, a block having a larger code amount is prioritized and interpolation area determination processing is performed for the block having a larger code amount. If interpolation performance has not been lowered up to the previous step in the order of interpolation area determination processing steps, the interpolation area determination device 12a determines an area that is a target of the interpolation area determination processing, as an interpolation target area. The interpolation area determination device 12a preferentially performs interpolation area determination processing for an area of an image that is difficult to code by HEVC or the like (image for which enhancement in prediction accuracy of intra prediction or inter prediction is difficult), image interpolation for the area being possible.

The interpolation area determination processing includes non-interpolated block generation processing, non-interpolated block evaluation processing, defective block generation processing, defective block interpolation processing, interpolated block evaluation processing, and determination processing. For each of the determination target blocks, the interpolation area determination device 12a outputs a result of determination of whether or not to determine the determination target area as an interpolation target area (result of determination for the determination target block) to the defective image generation section 13.

The interpolation area determination processing is repeated on a determination target block-by-determination target block basis until the interpolation area determination processing is performed for all of the determination target blocks in the input image. In other words, a plurality of interpolation area determination processing steps are performed. An order of selection of the determination target blocks may be an arbitrary order (for example, a raster scan order). A decoding apparatus selects interpolation target areas in an order that is the same as the order of selection of the determination target blocks and performs image interpolation processing for each selected interpolation target area.

The non-interpolated block generation section 120 acquires a determination target block from the block division section 11. The non-interpolated block generation section 120 acquires a result of the determination up to the previous interpolation area determination processing step, from the determination result memory 126. The non-interpolated block generation section 120 performs non-interpolated block generation processing based on the result of the determination up to the previous interpolation area determination processing step and the determination target block.

As the non-interpolated block generation processing, the non-interpolated block generation section 120 generates a determination target block (image with no interpolation), that is, a determination target block with no image interpolated (hereinafter referred to as "non-interpolated block"), in the original image, the determination target block being coded by HEVC or the like. The non-interpolated block generation section 120 outputs the non-interpolated block to the non-interpolated block evaluation section 121. In the non-interpolated block generation processing, the non-interpolated block generation section 120 outputs a code amount of the non-interpolated block coded by HEVC or the like to the determination section 125. For example, the code amount of the non-interpolated block is determined according to an accuracy of prediction of an image of the determination target block where the prediction is performed using intra prediction or inter prediction.

Note that an area in the determination target block, the area being determined as an interpolation target area up to the previous (past) interpolation area determination processing step, may be determined as a non-reference area in the non-interpolated block generation processing. The determination target block including the area determined as a non-reference area is coded according to a predetermined standard, for example, HEVC or the like.

The non-interpolated block evaluation section 121 includes an evaluation network 1210 (estimation network). The evaluation network 1210 is, for example, a convolutional neural network. Where the coding apparatus 10*a* determines whether or not to determine a determination target area as an interpolation target area in a defective image, using the evaluation network, there are a learning phase and an estimation phase as phases of operation of the evaluation network.

In the learning phase, the evaluation network 1210 receives an input of all or part of areas of an image and outputs a degree of naturalness. The degree of naturalness can be translated into a degree of likelihood of the image being estimated as not being a generated image. The evaluation network may be translated into a discriminator in an adversarial learning method. The discriminator learns in such a manner that, for example, a degree of naturalness of an original image is raised and a degree of naturalness of a generated image is lowered. Meaning of "generation (generated)" mentioned here includes interpolation (interpolated).

In the estimation phase, the non-interpolated block evaluation section 121 acquires the non-interpolated block. The evaluation network 1210 of the non-interpolated block evaluation section 121 quantifies a degree of naturalness (subjective image quality: a degree of not appearing odd) of the non-interpolated block of the input image by evaluating the degree of naturalness of the non-interpolated block of the input image.

In other words, in the non-interpolated block evaluation processing, the non-interpolated block evaluation section 121 outputs the degree of naturalness of the non-interpolated block to the determination section 125 by inputting the non-interpolated block to the learned evaluation network 1210.

The defective block generation section 122 acquires the determination target block from the block division section 11. The defective block generation section 122 acquires the result of determination up to the previous interpolation area determination processing step, from the determination result memory 126. As defective block generation processing, the defective block generation section 122 generates a defective block. The defective block generation section 122 outputs the defective block to the defective block interpolation section 123. The defective block generation section 122 outputs a code amount of the defective block to the determination section 125.

In the defective block generation processing, the defective block generation section 122 may remove one or more determination target areas that are targets of determination up to the previous step in the determination target block by excluding a determination target area from the determination target block based on the determination target block and the result of determination up to the previous interpolation area determination processing step.

The defective block generation section 122 outputs the determination target block coded by HEVC or the like in which a determination target area is missing (hereinafter referred to as "defective block") to the defective block interpolation section 123. The defective block generation section 122 outputs a code amount of the defective block coded by HEVC or the like to the determination section 125.

Note that an area in a determination target block, the area being determined as an interpolation target area up to the previous (past) interpolation area determination processing step may be determined as a non-reference area in the defective block generation processing. The determination target block including the area determined as a non-reference area is coded according to the predetermined standard, for example, HEVC or the like. In this case, the area determined as a non-reference area in the non-interpolated block generation processing is determined as a non-reference area in the defective block generation processing.

The defective block interpolation section 123 acquires the defective block from the defective block generation section 122. As defective block interpolation processing, the defective block interpolation section 123 interpolates an image of the missing determination target area in the defective block to the defective block to generate a block to which the image of the missing determination target area (hereinafter referred to as "missing area") has been interpolated (hereinafter referred to as "interpolated block"). The defective block interpolation section 123 outputs the interpolated block to the interpolated block evaluation section 124.

The defective block interpolation processing performed by the defective block interpolation section 123 is processing that is similar to defective block interpolation processing performed by the decoding apparatus. The defective block interpolation processing performed by the defective block interpolation section 123 is implemented using, for example, a convolutional neural network for interpolating a missing area of an input image.

The interpolated block evaluation section 124 includes an evaluation network 1240. The evaluation network 1240 is, for example, a convolutional neural network. The evaluation network 1240 is a network that is the same as the evaluation network 1210. The evaluation network 1240 quantifies a degree of naturalness of an interpolated block of an input image, for example, by evaluating the degree of naturalness of the interpolated block of the input image (subjective image quality, that is, a degree of not appearing odd).

The interpolated block evaluation section 124 acquires the interpolated block. In interpolated block evaluation processing, the interpolated block evaluation section 124 outputs degrees of naturalness of the interpolated block to the determination section 125 by inputting the interpolated block to the evaluation network 1240.

The evaluation network 1240 may be a network that is the same as the evaluation network 1210 in the non-interpolated block evaluation processing. In the estimation phase, the evaluation network 1210 of the interpolated block evaluation section 124 acquires a result of interpolation of images to a defective image and outputs a degree of naturalness of the result of interpolation of images to the defective image (defective image with images interpolated thereto).

The determination section 125 acquires the code amount of the non-interpolated block from the non-interpolated block generation section 120. The determination section 125 acquires the degree of naturalness of the non-interpolated block from the non-interpolated block evaluation section 121. The determination section 125 acquires the code amount of the defective block from the defective block generation section 122. The determination section 125 acquires the degree of naturalness of the interpolated block from the interpolated block evaluation section 124.

The determination section 125 performs determination processing based on the code amount of the non-interpolated block, the degree of naturalness of the non-interpolated block, the code amount of the defective block and the degree of naturalness of the interpolated block. For each determination target block, the determination section 125 outputs a result of determination of whether or not to determine an interpolation target area (result of determination for the determination target block) to the defective image generation section 13 and the determination result memory 126.

As determination processing, the determination section 125 determines whether a determination target area in a determination target block such as illustrated in FIG. 4 is determined as an interpolation target area or a non-interpolation area, based on the code amount "$R_1$" of the non-interpolated block, the degree of naturalness "$N_1$" of the non-interpolated block, the code amount "$R_2$" of the defective block, and the degree of naturalness "$N_2$" of the interpolated block, The determination section 125 derives a code amount "R" eliminated where a determination target area in a determination target block is determined as an interpolation target area, as indicated in Expression (3).
[Math. 3]

$$R=R_1-R_2 \quad (3)$$

If Expression (4) holds, the determination section 125 determines the determination target area in the determination target block as an interpolation target area. If Expression (4) does not hold, the determination section 125 determines the determination target area in the determination target block as a non-interpolation area.
[Math. 4]

$$N_1<N_2+wR \quad (4)$$

Here, w is a parameter representing a degree of importance of the code amount eliminated as a result of the determination target area being determined as an interpolation target area. The parameter "w" is determined in advance based on, e.g., a code amount that should be eliminated.

The defective image generation section 13 (substitution section) acquires the input image (original image). The defective image generation section 13 acquires the results of determination for the determination target blocks from the determination section 125. The defective image generation section 13 performs defective image generation processing based on the input image and the results of determination for the determination target blocks.

As the defective image generation processing, the defective image generation section 13 substitutes each of pixel values of the interpolation target area in each determination target block with a pixel value that minimizes a code amount of the determination target block (for example, 0). In other words, the defective image generation section 13 generates a defective image by excluding the areas each determined as an interpolation target area by the determination section 125 in the interpolation area determination processing from the input image based on the input image and the results of determination for the determination target blocks. For example, the defective image generation section 13 may exclude the areas each determined as an interpolation target area from the input image, by substituting each of pixel values in each of the areas each determined as an interpolation target area with an average value of the interpolation target area or a fixed value. The defective image generation section 13 outputs the defective image to the defective image coding section 14.

The defective image coding section 14 acquires the defective image from the defective image generation section 13. The defective image coding section 14 performs defective image coding processing for the defective image. In the defective image coding processing, the defective image coding section 14 generates coded data of the defective image by performing coding processing, for example, HEVC or the like for the defective image. The defective image coding section 14 outputs the coded data of the defective image to the decoding apparatus.

The defective image coding section 14 may transmit positions (coordinates) of the interpolation target areas in the input image and the coded data of the defective image to the decoding apparatus. Also, the defective image coding section 14 may omit the processing for transmission of the positions (coordinates) of the interpolation target area in the input image, by the coding apparatus 10a and the decoding apparatus determining the positions of the interpolation target areas in the input image based on a parameter (particular information) shared between the coding apparatus 10a and the decoding apparatus.

Figure 5:
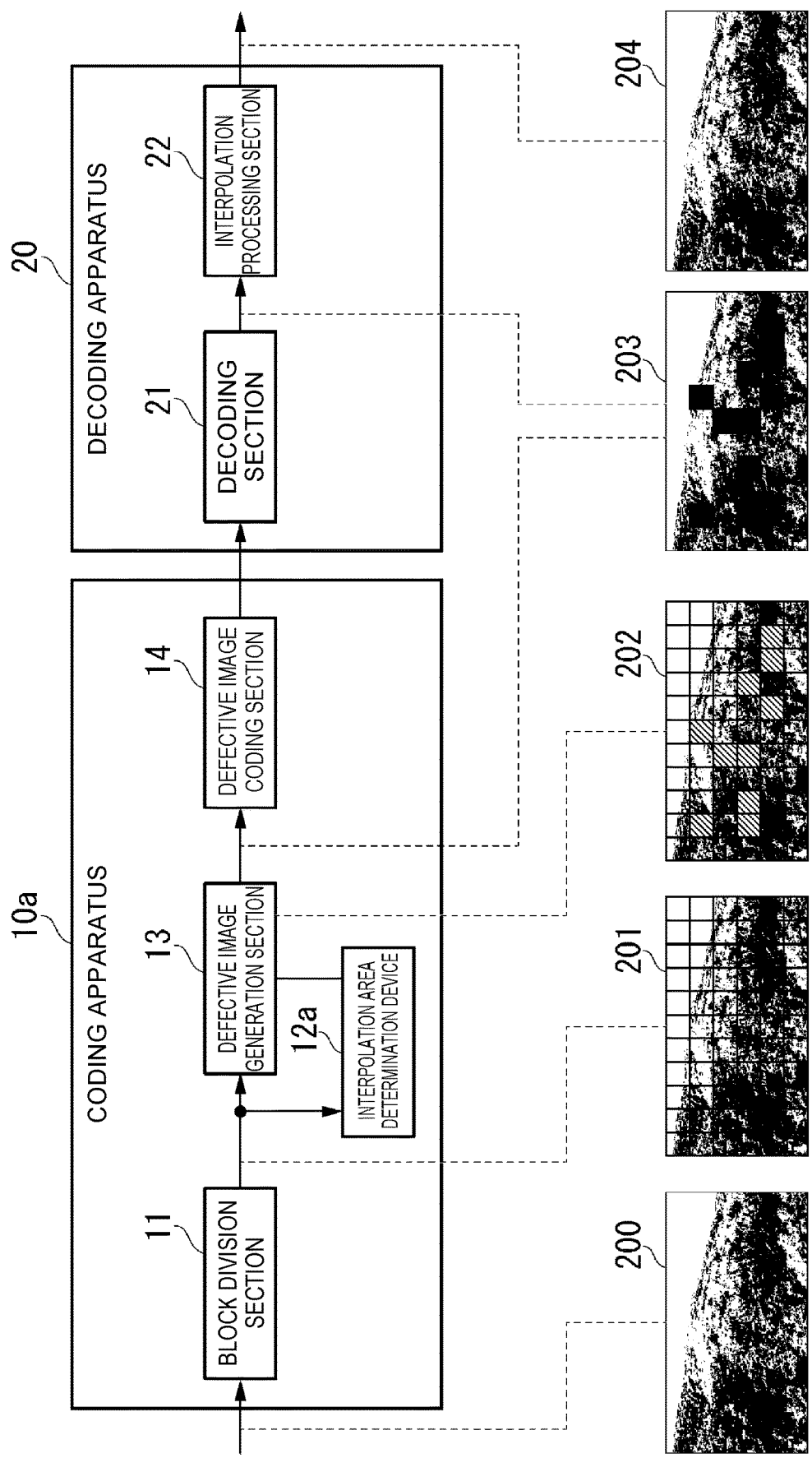
FIG. 5 is a diagram illustrating an example configuration of the coding apparatus and a decoding apparatus in the first embodiment.

FIG. 5 is a diagram illustrating example configurations of the coding apparatus 10a and a decoding apparatus 20. The block division section 11 acquires an original image 200. The interpolation area determination device 12a and the defective image generation section 13 acquire a determination target block group 201 of determination target blocks from the block division section 11. Each determination target block may include an area in a determination target block, the area being determined as an interpolation target area up to a previous (past) interpolation area determination processing step. If an evaluation measure (degree of naturalness) determined for an interpolation target area adjacent to a determination target area (peripheral interpolation target area) is not lowered in current interpolation area determination processing, the interpolation area determination device 12a determines the determination target area in the current interpolation area determination processing as an interpolation target area.

The defective image generation section 13 generates a determination result image 202, which is an image representing results of determination for the determination target blocks. The defective image generation section 13 generates a defective image 203 based on the determination result image 202. The defective image coding section 14 acquires the defective image 203 from the defective image generation section 13. The defective image coding section 14 performs coding processing for the defective image 203 based on, for example, HEVC or the like. The defective image coding section 14 outputs coded data of the defective image 203 to the decoding apparatus 20.

The decoding apparatus 20 includes a decoding section 21 and an interpolation processing section 22. The decoding section 21 acquires the coded data of the defective image 203. The decoding section 21 performs decoding processing for the coded data of the defective image 203 based on HEVC or the like. The decoding section 21 outputs the decoded defective image 203 to the interpolation processing section 22.

The interpolation processing section 22 interpolates images of interpolation target areas in the decoded defective image 203 to the decoded defective image 203. Image interpolation processing performed by the interpolation processing section 22 is not limited to particular image interpolation processing. For example, the interpolation processing section 22 interpolates an average image of one or more reference areas 104 existing around the determination target area 103 in the determination target block illustrated in FIG. 4 to the decoded defective image as an image of the interpolation target area at the position of the determination target area 103. A weight coefficient may be determined for each of one or more reference areas 104. The average image of the reference areas 104 may be generated according to the respective weight coefficients of the reference areas 104. The interpolation processing section 22 may interpolate an image of one reference area 104 existing in the periphery of the determination target area 103 in the determination target block illustrated in FIG. 4 to the decoded defective image as an image of an interpolation target area at a position of the determination target area 103. In this way, the interpolation processing section 22 generates a restored image 204 of the input image.

Figure 6:
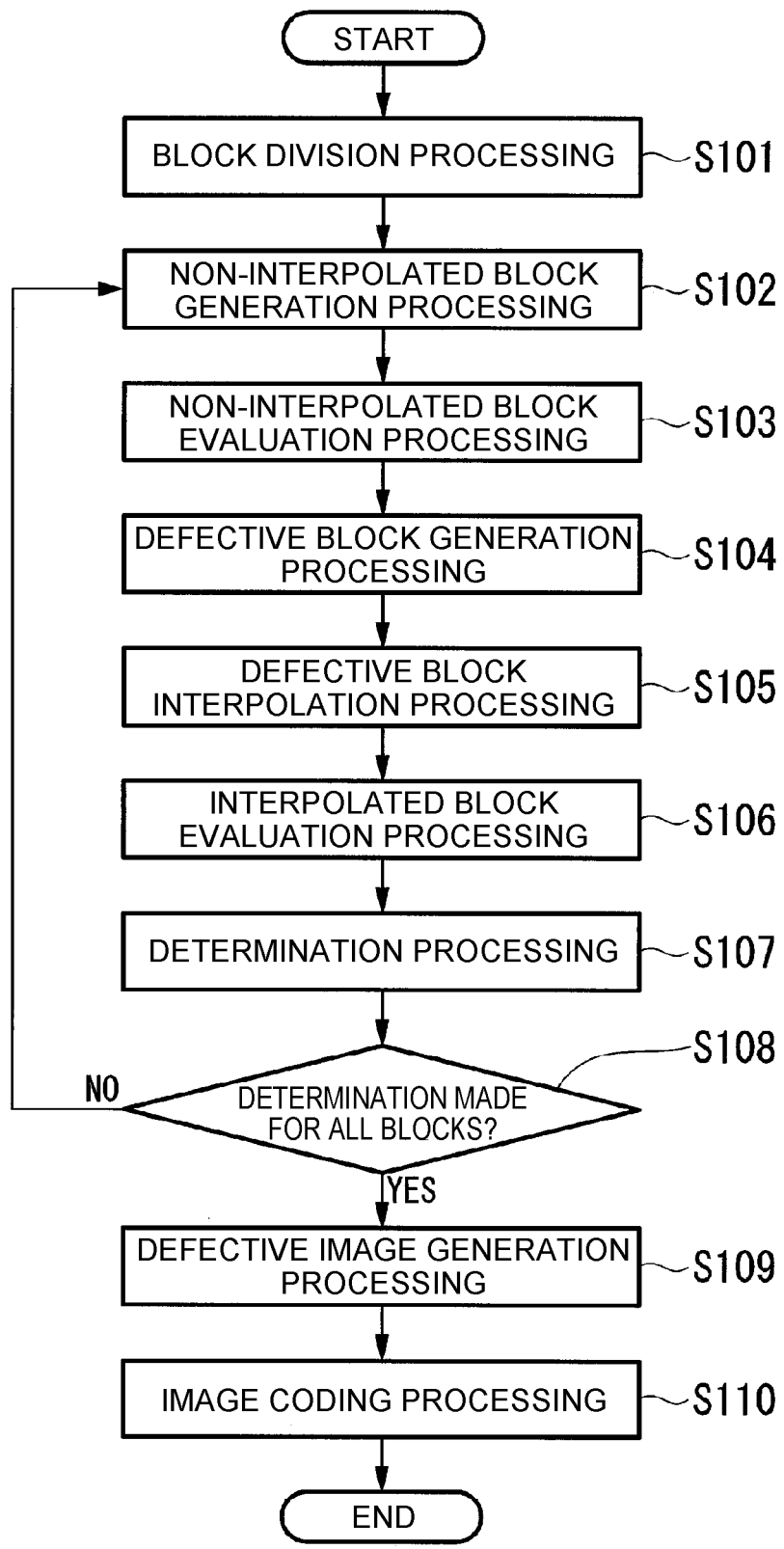
FIG. 6 is a flowchart illustrating an example operation of the coding apparatus in the first embodiment.

Next, an example operation of the coding apparatus 10a will be described. FIG. 6 is a flowchart illustrating an example operation of the coding apparatus 10a. The block division section 11 performs block division processing (step S101). The non-interpolated block generation section 120 performs non-interpolated block generation processing (step S102). The non-interpolated block evaluation section 121 performs non-interpolated block evaluation processing (step S103).

The defective block generation section 122 performs defective block generation processing (step S104). The defective block interpolation section 123 performs defective block interpolation processing (step S105). The interpolated block evaluation section 124 performs interpolated block evaluation processing (step S106). The determination section 125 performs determination processing (step S107).

The determination section 125 determines whether or not the interpolation target area determination has been made for all of determination target blocks in an input image (step S108). If the interpolation target area determination has not been performed for any of the determination target blocks in the input image (step S108: NO), the non-interpolated block generation section 120 performs the operation in step S102.

If the interpolation target area determination has been made for all of the determination target blocks in the input image (step S108: YES), the defective image generation section 13 performs defective image generation processing (step S109). The defective image coding section 14 performs image coding processing (step S110).

Figure 7:
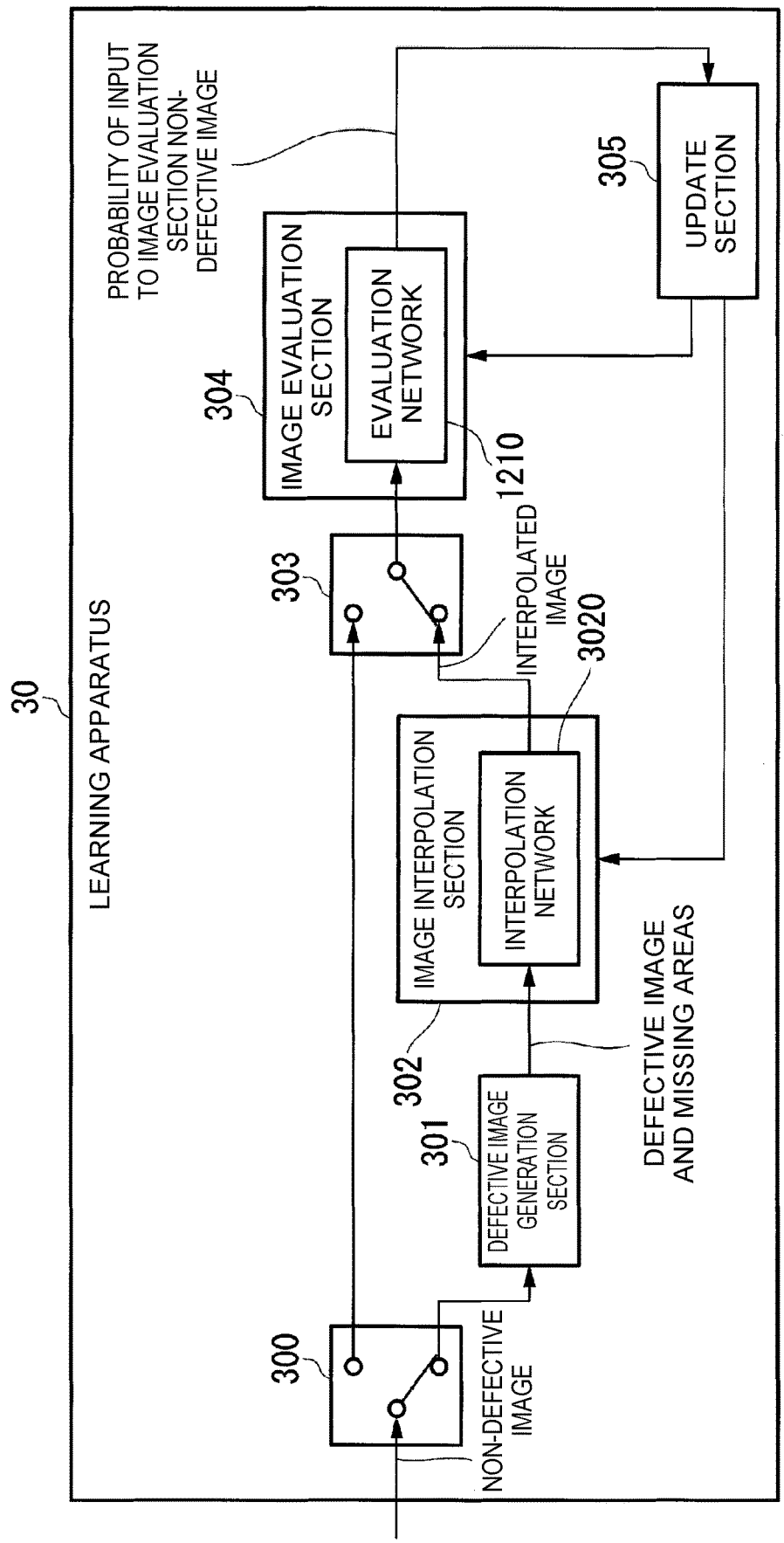
FIG. 7 is a diagram illustrating an example configuration of a learning apparatus in the first embodiment.

Next, an evaluation network's learning in the learning phase will be described. FIG. 7 is a diagram illustrating an example configuration of a learning apparatus 30. The learning apparatus 30 performs the evaluation network 1210's learning according to an adversarial learning method. The evaluation network 1240 is a network that is the same as the evaluation network 1210.

The learning apparatus 30 includes a former switching section 300, a defective image generation section 301, an image interpolation section 302, a latter switching section 303, an image evaluation section 304, and an update section 305. A part or whole of the learning apparatus 30 is implemented in the form of software by a processor such as a CPU executing a program stored in a memory that is a non-volatile recording medium (non-transitory recording medium). The program may be recorded on a computer-readable recording medium. A part or whole of the learning apparatus 30 may be implemented using hardware including an electronic circuit using, for example, an LSI, an ASIC, a PLD, an FPGA or the like.

In the below, a sign provided above a character in a mathematical expression is indicated immediately just ahead of the character. For example, the sign "^" provided above the character "M" in a mathematical expression is indicated just ahead of the character "M" like "^M". In the below, in a mathematical expression, an operator including one dot inside a circle represents an element-wise product of matrices.

The former switching section 300 acquires a predetermined image other than a defective image (hereinafter referred to as "non-defective image"). The non-defective image is, for example, a predetermined original image. In a first switching state, the former switching section 300 outputs a non-defective image "x" to the latter switching section 303.

In a second switching state, the former switching section 300 outputs the non-defective image "x" to the defective image generation section 301. The defective image generation section 301 acquires the non-defective image "x". The defective image generation section 301 outputs "^M" representing whether or not a relevant area is a missing area, to the image interpolation section 302. The defective image generation section 301 outputs an image resulting from the missing areas "^M" being excluded from the non-defective image "x" to the image interpolation section 302 as a defective image. The defective image is represented as Expression (5).

[Math. 5]

$$x \odot (1 - \hat{M}) \tag{5}$$

Here, coordinates of each missing area "^M" are arbitrarily determined in advance. A value of "^M" may be expressed in the form of a flag. For example, if "^M" represents a missing area, the value of "^M" is 1. If "^M" represents a non-defective area, the value of "^M" is 0.

The image interpolation section 302 includes an interpolation network 3020. The interpolation network 3020 is, for example, a convolutional neural network. The interpolation network 3020 is a generator including a generation network in a generative adversarial network (GAN). The image interpolation section 302 inputs "^M" representing whether or not a relevant area is a missing area and a defective image (feature value) to the interpolation network 3020. The interpolation network 3020 "G" interpolates an image of each missing area to the missing area "^M" of the defective image. The interpolation network 3020 "G" outputs an interpolated image "G" such as illustrated in Expression (6) to the latter switching section 303.

[Math. 6]

$$G(x \odot (1-\hat{M}), \hat{M}) \quad (6)$$

In the first switching state, the latter switching section 303 acquires the non-defective image "x" from the former switching section 300. The latter switching section 303 outputs the non-defective image "x" to the image evaluation section 304. In the second switching state, the latter switching section 303 acquires the interpolated image "G" from the image interpolation section 302. The latter switching section 303 outputs the interpolated image "G" to the image evaluation section 304.

The image evaluation section 304 includes an evaluation network 1210. The evaluation network 1210 is a discriminator including a discrimination network in a generative adversarial network. If a switching state of the latter switching section 303 is the first switching state, the image evaluation section 304 inputs the non-defective image "x" to the evaluation network 1210. The evaluation network 1210 outputs a probability "D(x)" of the non-defective image input to the evaluation network 1210 being the non-defective image "x" to the update section 305.

If the switching state of the latter switching section 303 is the second switching state, the image evaluation section 304 inputs the interpolated image "G" to the evaluation network 1210. The evaluation network 1210 outputs a probability "D(x)" of the interpolated image input to the evaluation network 1210 being the non-defective image "x" to the update section 305.

The update section 305 updates a parameter of the interpolation network 3020 and a parameter of the evaluation network 1210 alternately based on the probability value (degree of naturalness) output from the evaluation network 1210 of the image evaluation section 304. The update is performed based on optimization in Expression (7).

[Math. 7]

$$\min_D \max_G V(G, D) = \mathbb{E}_{x \in X} \left[ \log D(x) + \log \left(1 - D\left(G(x \odot (1 - \hat{M}), \hat{M})\right)\right) \right] \quad (7)$$

Here, x is a distribution (degree of naturalness) of a group of images of training data. The learning apparatus 30 repeats learning using many training data. The evaluation network 1210 repeats learning of probability values as a network that discriminates between a non-defective image and an interpolated image.

The above-described adversarial learning method is an example. The evaluation network 1210 can learn by means of adversarial learning with an arbitrary generation network. The evaluation network 1210 and the interpolation network 3020 may learn simultaneously rather than learning alternately.

As above, the coding apparatus 10a of the first embodiment codes an original image (target image). The coding apparatus 10a includes the block division section 11 (division section), the determination section 125, and the defective image generation section 13 (substitution section). The block division section 11 divides the original image into respective determination target blocks each including a determination target area that is a target of determination of whether or not an image is interpolated to a result of decoding of a part of the original image (defective image). For each of the determination target blocks, the determination section 125 determines whether or not to determine the relevant determination target area as an interpolation target area in the defective image. The defective image generation section 13 substitutes each of pixel values of each of the determination target areas each determined as an interpolation target area, with a value that decreases a code amount of the relevant determination target block. The determination section 125 determines whether or not to determine the determination target area as an interpolation target area, using an evaluation based on accuracy of prediction of the determination target block by intra prediction or inter prediction in HEVC or the like and the degree of an image of the interpolation target area not being an interpolated one (degree of the interpolation target area being a generated one) (degree of naturalness).

Consequently, it is possible to determine interpolation target areas in an input original image in such a manner that subjective image quality of a restored image becomes favorable.

The determination section 125 preferentially determines a determination target area in a determination target block having a larger code amount, as an interpolation target area. If an evaluation determined for an interpolation target area in the periphery of a determination target area is not lowered, the determination section 125 determines the determination target area as an interpolation target area. The evaluation is based on accuracy of prediction of an image of the relevant determination target block by intra prediction or inter prediction in HEVC or the like and a degree of naturalness that is a probability value output from a neural network having learned using images generated by a generator in a generative adversarial network.

The coding apparatus 10a determines an area that does not make a restored image appear odd even if the decoding apparatus 20 interpolates an image to the area, as an interpolation target area. In HEVC, even in the case of an area that is difficult to code, in order to prevent making a restored image appear odd, the coding apparatus 10a can determine whether or not to determine the determination target area as an interpolation target area.

(1) In determination processing, the determination section 125 determines an interpolation target area without referring to an original image. The determination section 125 compares a degree of naturalness of a non-interpolated block output from the learned evaluation network 1210 and a score derived according to a code amount of the non-interpolated block. The determination section 125 compares a degree of naturalness of an interpolated block output from the learned evaluation network 1240 and a score derived according to a code amount of the interpolated block. The determination section 125 determines whether or not to determine a determination target area as an interpolation target area, not based on an error between an original image and an interpolated image or the like. Consequently, it is possible to determine even a determination target area of a complex image in which pixel values close to pixel values of a missing area cannot be obtained by interpolation processing, as an interpolation target area. Therefore, coding efficiency is enhanced. Also, since an even image is less likely to be interpolated to an area of a complex image, blurring of a restored image is curbed, enhancing subjective image quality of the restored image.

(2) The interpolation area determination device 12a applies a model obtained using an adversarial learning method, to processing for determining whether or not to determine an area as an interpolation target area. Since subjective image quality of a determination target image needs to be evaluated without referring to an original image, design of an evaluation measure is important. The interpolation area determination device 12a makes the model obtained using adversarial learning obtain an evaluation measure for subjective image quality. Consequently, a degree of naturalness of an input image is defined as an evaluation measure for subjective image quality of the input image. The degree of naturalness of an input image is closeness to a group of images determined in advance as natural images (teaching image group).

Second Embodiment

A second embodiment is different from the first embodiment in that whether or not to determine a determination target area as an interpolation target area is determined by a determination section based on an error between a determination target block and a non-interpolated block of an original image and an error between the determination target block and an interpolated block of the original image. The second embodiment will be described in terms of differences from the first embodiment.

Figure 8:
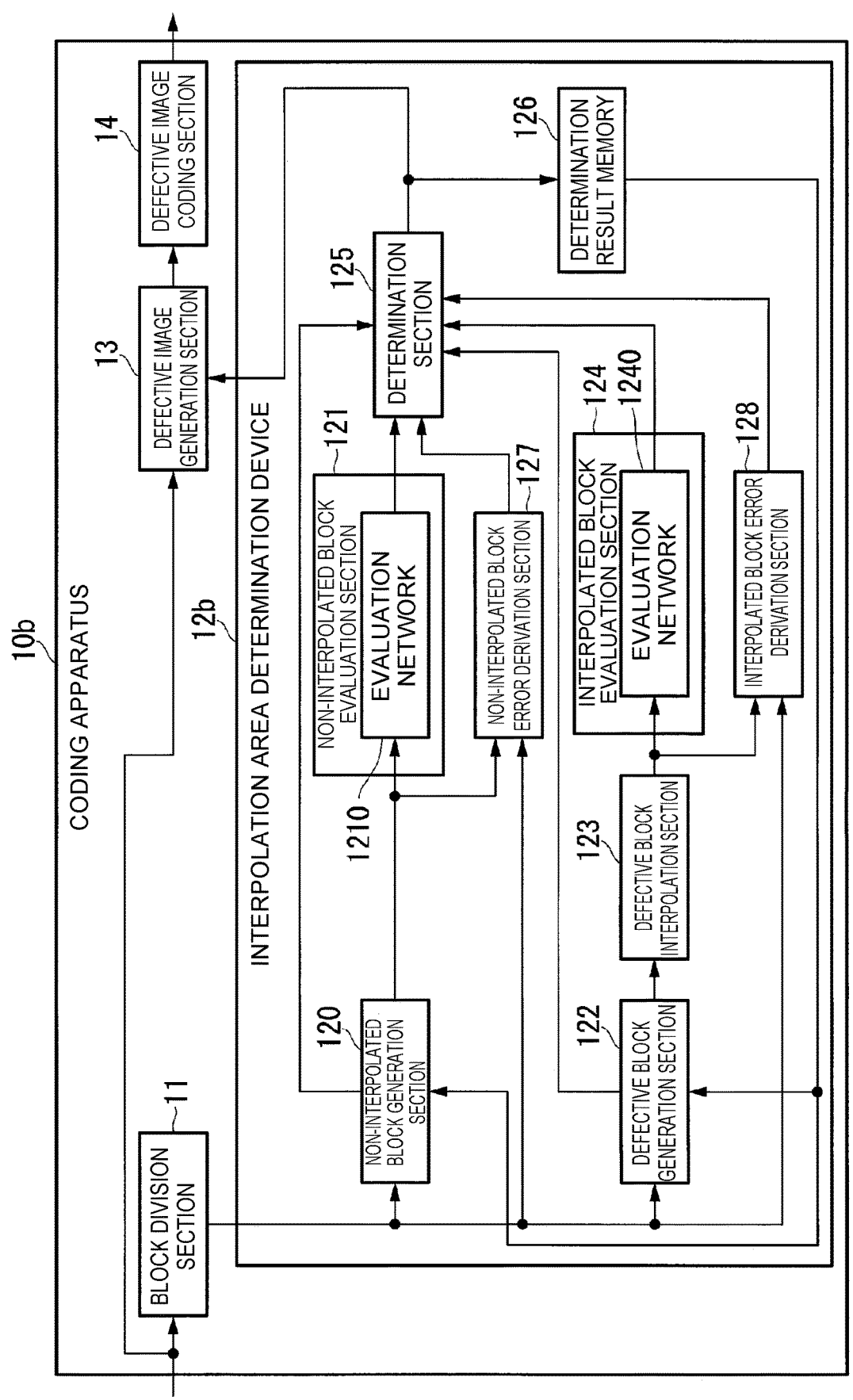
FIG. 8 is a diagram illustrating an example configuration of a coding apparatus in a second embodiment.

FIG. 8 is a diagram illustrating an example configuration of the coding apparatus 10b. coding apparatus 10b is an apparatus that codes data of, e.g., a moving image or a still image. The coding apparatus 10b includes a block division section 11, an interpolation area determination device 12b, a defective image generation section 13, and a defective image coding section 14. The interpolation area determination device 12b includes a non-interpolated block generation section 120, a non-interpolated block evaluation section 121, a defective block generation section 122, a defective block interpolation section 123, an interpolated block evaluation section 124, a determination section 125, a determination result memory 126, a non-interpolated block error derivation section 127, and an interpolated block error derivation section 128.

The non-interpolated block error derivation section 127 acquires a non-interpolated block from the non-interpolated block generation section 120. The non-interpolated block error derivation section 127 acquires a determination target block from the block division section 11. As non-interpolated block error derivation processing, the non-interpolated block error derivation section 127 derives a difference between an image of a determination target area in the determination target block and an image of a determination target area in the non-interpolated block. The derived difference is expressed using, for example, SSE, a peak signal-to-noise ratio (PSNR) or a structural similarity (SSIM). The non-interpolated block error derivation section 127 outputs the derived difference to determination section 125 as an error of the non-interpolated block.

The interpolated block error derivation section 128 acquires an interpolated block from the defective block interpolation section 123. The interpolated block error derivation section 128 acquires the determination target block from the block division section 11. As interpolated block error derivation processing, the interpolated block error derivation section 128 derives a difference between an image of a determination target area in the determination target block and an image of a determination target area in the interpolated block in a manner that is similar to the non-interpolated block error derivation processing. The interpolated block error derivation section 128 outputs the derived difference to the determination section 125 as an error of the interpolated block.

The determination section 125 acquires a code amount of the non-interpolated block from the non-interpolated block generation section 120. The determination section 125 acquires a degree of naturalness of the non-interpolated block from the non-interpolated block evaluation section 121. The determination section 125 acquires a code amount of a defective block from the defective block generation section 122. The determination section 125 acquires a degree of naturalness of the interpolated block from the interpolated block evaluation section 124. The determination section 125 acquires the error of the non-interpolated block from the non-interpolated block error derivation section 127. The determination section 125 acquires the error of the interpolated block from the interpolated block error derivation section 128.

The determination section 125 performs determination processing based on the code amount of the non-interpolated block, the degree of naturalness of the non-interpolated block, the error of the non-interpolated block, the code amount of the defective block, the degree of naturalness of the interpolated block and the error of the interpolated block. For each of the determination target blocks, the determination section 125 outputs a result of determination of whether or not to determine a determination target area as an interpolation target area (result of determination for the determination target block) to the defective image generation section 13 and the determination result memory 126.

As determination processing, the determination section 125 determines whether a determination target area in a determination target block such as illustrated in FIG. 4 as an interpolation target area or a non-interpolation area, based on a code amount "$R_1$" of a non-interpolated block, a degree of naturalness "$N_1$" of the non-interpolated block, an error "$D_1$" of the non-interpolated block, a code amount $R_2$" of a defective block, a degree of naturalness "$N_2$" of an interpolated block and an error "$D_2$" of the non-interpolated block.

The determination section 125 derives a code amount "R" eliminated where the determination section 125 determines the determination target area in the determination target block as an interpolation target area, as in Expression (3).

If Expression (8) holds, the determination section 125 determines the determination target area in the determination target block as an interpolation target area. If Expression (8) does not hold, the determination section 125 determines the determination target area in the determination target block as a non-interpolation area.

[Math. 8]

$$N_1 - w_D D_1 < N_2 - w_D D_2 + wR \qquad (8)$$

Here, $w_D$ is a parameter representing a degree of importance of an error of the interpolated block. The parameter $w_D$ is determined in advance based on a degree of tolerance of an error between a decoded image and an original image.

Next, an example operation of the coding apparatus 10b will be described.

Figure 9:
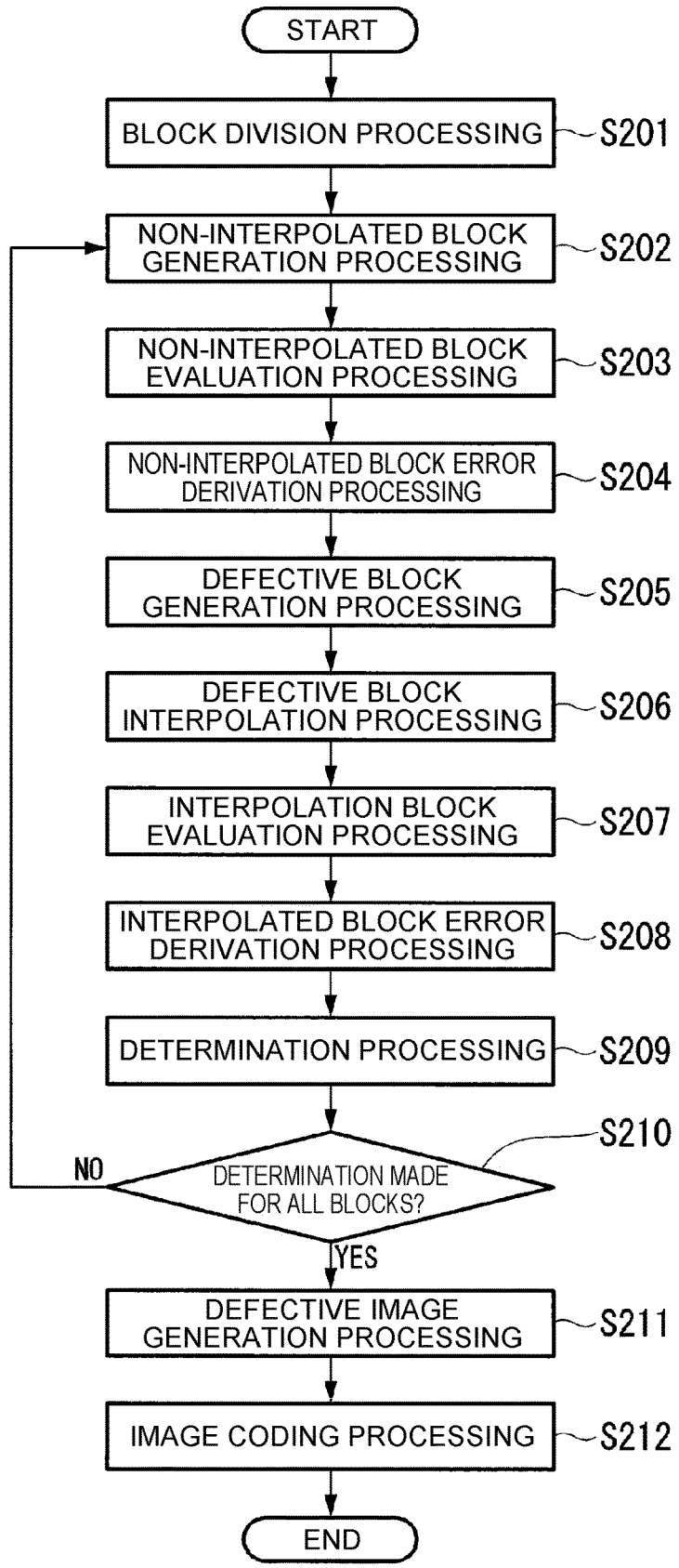
FIG. 9 is a flowchart illustrating an example operation of the coding apparatus in the second embodiment.

FIG. 9 is a flowchart illustrating an example operation of the coding apparatus 10b. Operation in steps S201 to S203 is similar to the operation in steps S101 to S103 illustrated in FIG. 6. The non-interpolated block error derivation section 127 performs non-interpolated block error derivation processing (step S204). Operation in steps S205 to S207 is similar to the operation in steps S104 to S106 illustrated in FIG. 6. The interpolated block error derivation section 128 performs interpolated block error derivation processing (step S208). The determination section 125 performs determination processing (step S209).

The determination section 125 determines whether or not the interpolation target area determination has been made for all determination target blocks in an input image (step S210). If the interpolation target area determination has not been made for any of the determination target blocks in the input image (step S210: NO), the non-interpolated block generation section 120 performs the operation in step S202.

If the interpolation target area determination has been made for all the determination target blocks in the input image (step S210: YES), the defective image generation section 13 performs defective image generation processing (step S211). The defective image coding section 14 performs image coding processing (step S212).

As above, if an evaluation determined for an interpolation target area in the periphery of a determination target area is not lowered, the determination section 125 of the second embodiment determines the determination target area as an interpolation target area. If an evaluation based on an accuracy of prediction of an image of a determination target block by intra prediction or inter prediction in HEVC or the like and a degree of an image of an interpolation target area not being an interpolated one (degree of naturalness) is enhanced and an evaluation determined for an interpolation target area in the periphery of the determination target area is not lowered, the determination section 125 may determine the determination target area as an interpolation target area.

Consequently, it is possible to determine an interpolation target area in an input original image in such a manner that subjective image quality of a restored image becomes favorable. Determination of whether or not interpolation is preferentially performed for an area whose code amount becomes larger when the area is coded by HEVC or the like, enabling preventing a complex area from being excluded from interpolation targets because of an even area.

(3) The interpolation area determination device 12b may perform both processing for determining an interpolation target area without referring to an original image and processing for determining an interpolation target area with reference to the original image, in determination processing. Consequently, the interpolation area determination device 12b determines a determination target area of an image that is similar to an original image on a pixel-by-pixel basis as an interpolation target area, enabling enhancement in subjective image quality. If a code amount can become equal to or larger than a threshold value, it is possible to generate a restored image that is similar to an original image.

Although embodiments of this invention have been described in detail above with reference to the drawings, the specific configuration is not limited to those of the embodiments but design changes, etc., are possible without departing of the spirit of this invention.

The coding apparatus 10a and the coding apparatus 10b may perform coding processing other than HEVC (for example, H.264/AVC). The coding apparatus 10a and the coding apparatus 10b may code data other than images (for example, audio data). The coding apparatus 10a and the coding apparatus 10b may, for example, interpolate audio data. In other words, processing performed by the coding apparatus 10a or the coding apparatus 10b is processing that can be applied to a coder corresponding to an arbitrary decoder and is processing that can be employed for an arbitrary image generation method. A result of determination of whether or not to determine a determination target area as an interpolation target area may be regarded as one of parameters of a coding apparatus that complies with an image coding standard.

INDUSTRIAL APPLICABILITY

The present invention is applicable to a coding apparatus (image processing apparatus) for a still image or a moving image.

REFERENCE SIGNS LIST 10a, 10b coding apparatus
11 block division section
12a, 12b interpolation area determination device
13 defective image generation section
14 defective image coding section
20 decoding apparatus
21 decoding section
22 interpolation processing section
30 learning apparatus
100 processor
101 memory
102 storage device
103 determination target area
104 reference area
105 non-reference area
120 non-interpolated block generation section
121 non-interpolated block evaluation section
122 defective block generation section
123 defective block interpolation section
124 interpolated block evaluation section
125 determination section
126 determination result memory
127 non-interpolated block error derivation section
128 interpolated block error derivation section
200 original image
201 determination target block group
202 determination result image
203 defective image
204 restored image
300 former switching section
301 defective image generation section
302 image interpolation section
303 latter switching section
304 image evaluation section
305 update section
1210 evaluation network
1240 evaluation network
3020 interpolation network

The invention claimed is:

1. A coding apparatus for coding an original image, the coding apparatus comprising:
   a processor; and
   a storage medium having computer program instructions stored thereon, when executed by the processor, perform to:
   divide the original image into blocks that are a plurality of areas to acquire the plurality of blocks;
   for each of the blocks, determine whether or not to determine the block as an interpolation target;

substitute a value of a pixel included in the block determined as the interpolation target, with a value that decreases a code amount of the block determined as the interpolation target;

determine the value that decreases a code amount as an average value of an interpolation target area; and determine whether or not to determine the block that is a target of the determination as the interpolation target, using an evaluation based on an accuracy of prediction of an image of the block by intra prediction or inter prediction and a degree of naturalness of the block that is the interpolation target, the degree of naturalness corresponding to a likelihood of the block as not having been a generated image.

2. The coding apparatus according to claim 1, wherein the computer program instructions further perform to determine a block having a larger code amount from among the plurality of blocks, as the interpolation target.

3. The coding apparatus according to claim 2, wherein the computer program instructions further perform to determine the block that is a target of the determination as an interpolation target only where, when the block that is a target of the determination is coded as an interpolation target, an evaluation of a block adjacent to the block that is a target of the determination is not lowered.

4. The coding apparatus according to claim 3, wherein the degree is a probability value output from a discriminator having learned using an image generated by a generator in an adversarial generation network.

5. A non-transitory computer-readable medium having computer-executable instructions that, upon execution of the instructions by a processor of a computer, cause the computer to function as the coding apparatus according to claim 1.

6. A coding apparatus for coding an original image, the coding apparatus comprising:

a processor; and a storage medium having computer program instructions stored thereon, when executed by the processor, perform to:

divide the original image into a plurality of blocks to acquire the plurality of blocks;

for each of the blocks, determine whether or not to determine the block as an interpolation target;

substitute a value of a pixel included in the block determined as the interpolation target, with a value that decreases a code amount of the block determined as the interpolation target;

determine the value that decreases a code amount as an average value of an interpolation target area; and determine the block that is a target of the determination as an interpolation target only where, when the block that is a target of the determination is coded as an interpolation target, an evaluation of a block adjacent to the block that is a target of the determination is not lowered and an evaluation value of the block that is a target of the determination meets a predetermined criterion.

7. A coding method performed by a coding apparatus for coding an original image, the coding method comprising:

a division step of dividing the original image into blocks that are a plurality of areas to acquire the plurality of blocks;

a first determination step of, for each of the blocks, determining whether or not to determine the block as an interpolation target;

a substitution step of substituting a value of a pixel included in the block determined as the interpolation target, with a value that decreases a code amount of the block determined as the interpolation target; and a second determination step of determining the value that decreases a code amount as an average value of an interpolation target area;

wherein in the first determination step, whether or not to determine the block that is a target of the determination as the interpolation target is determined using an evaluation based on an accuracy of prediction of an image of the block by intra prediction or inter prediction and a degree of naturalness of the block that is the interpolation target, the degree of naturalness corresponding to a likelihood of the block as not having been a generated image.

* * * * *